(12) United States Patent
Talker

(10) Patent No.: US 6,954,740 B2
(45) Date of Patent: Oct. 11, 2005

(54) ACTION VERIFICATION SYSTEM USING CENTRAL VERIFICATION AUTHORITY

(76) Inventor: Albert Israel Talker, 14 Castlehill Dr., Marlboro, NJ (US) 07746

( * ) Notice: Subject to any disclaimer, the term of this patent is extended or adjusted under 35 U.S.C. 154(b) by 566 days.

(21) Appl. No.: 09/793,040

(22) Filed: Feb. 26, 2001

(65) Prior Publication Data

US 2002/0120585 A1 Aug. 29, 2002

(51) Int. Cl.[7] .............................. H04L 9/00; G06F 17/60
(52) U.S. Cl. .............................. 705/75; 705/76; 705/77; 705/78; 380/30; 380/43; 713/200
(58) Field of Search ................................. 705/1, 75, 76, 705/77, 78; 380/30, 43; 713/200

(56) References Cited

U.S. PATENT DOCUMENTS

| | | |
|---|---|---|
| 3,872,438 A | 3/1975 | Cuttill |
| 4,123,747 A | 10/1978 | Lancto |
| 4,317,957 A | 3/1982 | Sendrow |
| 5,005,200 A * | 4/1991 | Fischer .......................... 380/30 |
| 5,012,077 A | 4/1991 | Takano |
| 5,103,079 A | 4/1992 | Barakai |
| 5,163,086 A | 11/1992 | Ahearn et al. |
| 5,177,342 A | 1/1993 | Adams |
| 5,202,826 A | 4/1993 | McCarthy |
| 5,223,699 A | 6/1993 | Flynn |
| 5,231,569 A | 7/1993 | Myatt |
| 5,311,594 A | 5/1994 | Penzias |
| 5,365,046 A | 11/1994 | Haymann |
| 5,426,281 A | 6/1995 | Abecassis |
| 5,457,305 A | 10/1995 | Akel et al. |
| 5,500,513 A | 3/1996 | Langhans et al. |
| 5,677,955 A * | 10/1997 | Doggett et al. ................ 705/76 |
| 5,826,245 A | 10/1998 | Sandberg-Diment |
| 5,832,464 A | 11/1998 | Houvener et al. |
| 5,889,863 A * | 3/1999 | Weber .......................... 705/76 |
| 6,095,413 A | 8/2000 | Tetro |
| 6,209,091 B1 * | 3/2001 | Sudia et al. ................. 713/175 |
| 6,796,492 B1 * | 9/2004 | Gatto .......................... 235/379 |

FOREIGN PATENT DOCUMENTS

EP 658862 A * 6/1995 ............. G07F/7/10

OTHER PUBLICATIONS

Security Dynamics Releases Two–Part Security System: Spurs Battle to keep Hackers from Data. Korzeniowski, Paul, Computerworld, vol. 19, No. 42, p. 19, Oct. 21, 1985.*
Albert Israel Talker Title: Money PINS Money PINS principles and website operation as described in U.S. Appl. No. 09/793,040.

* cited by examiner

Primary Examiner—James P. Trtammell
Assistant Examiner—Daniel L. Greene (57) ABSTRACT

Architecture for central e-commerce authorization and verification using multiple Keys/Pins storage and central action verification means. Action Verification is provided between Action Initiating Party (12) and a central Verification Authority (16), wherein action includes a transaction, message, command, approval, identification request, financial transaction and data transmittal. Wherein action is authorized and initiated by an Entity (14) which can be an individual, company, vendor or other organization, which authorizes by giving a PIN, the execution, processing or delivering of an action. The action can be requested and/or transmitted and/or delivered electronically or mechanically. Verification information is stored in a Verification Authority system, accessed by Entities and the Action Initiating parties. The Entity stores in the Verification Authority sets of Personal Identification Numbers (PINS/Keys), and as a verification option, personal data parameters. The Entity is also able to generate automatically multiple Entity PINs/Keys. Verification includes validation of Entity's identity and the authorization of an action by comparing action PINs/Keys to a PIN/Key stored in the Verification Authority.

15 Claims, 10 Drawing Sheets

ACTION VERIFICATION SYSTEM USING CENTRAL VERIFICATION AUTHORITY

FIELD OF THE INVENTION

The present invention relates generally to Action Verification Systems and, more particularly, but not by way of limitation to:

a) an action verification system wherein each action is verified by submitting a verification request from an Action Initiating Party, to a Verification Authority system;

b) an action verification system wherein each action initiated by a Action Initiating Party is verified against set (PINs/Keys) stored within a Verification Authority system, whereby the Verification Authority System can be accessed by a third party, an Entity, which can enter or modify set of PINs/Keys used to verify an action.

c) an action verification system wherein each action is verified against set of PINs/Keys and optional set of personal data parameters stored in the Verification Authority system;

d) an action verification system wherein each action initiated by an Action Initiating Party is verified and then stored within a Verification Authority system, whereby the Verification Authority System can be accessed by a third party, the Entity, which can further verify at that time or some future time, action verification requests submitted to his account.

Wherein action as defined herein includes a financial transaction, message, command, non-financial transaction, approval, identification request and data approval. And wherein Entity as defined herein includes an individual, company or other organization, which authorizes by giving a PIN/KEY, the execution, processing or delivering of an action.

BACKGROUND OF THE INVENTION

Credit card and check frauds have become an ever-growing problem in recent years. Another development has been the rapid onset of electronic fund transfer through the use of bank debit cards or use of electronic data transfer (e.g. medical records, secret messages or bank transactions). As a protection against fraud and unauthorized actions, it is widely held that a PIN/KEY is one of the best methods for providing the cardholder and the issuer of the card with good security.

Only the Entity and the Action initiating Party know the PIN/KEY. When an Entity desires to initiate an action it can certify the action to the Action Initiating Party through the use of a PIN/KEY. This system is familiar to anyone who uses automatic bank teller machines. However, the PIN/KEY code is vulnerable to public visibility and is not usable without the physical presence of the Entity itself.

It is therefore an object of this invention to allow the use of an action PIN/KEY, which can be used to validate an Entity's identity and its authorization through the use of a PIN/KEY code entered into a Verification Authority central computer.

It is therefore a further object of this invention that the remote Verification Authority can communicate safely with another system by means of ordinary non-protected communication lines.

It is therefore a further object of this invention that the system has sufficient mobile capabilities so as to allow an Entity to authorize an action and enter an action PIN/KEY at various locations and through electronic means (e.g. tables in a restaurant, Internet or telephone).

It is therefore a further object of this invention to allow central verification of actions and that the system has sufficient mobile capabilities so as to allow an Entity to authorize an action and cuter action PIN/KEY at various locations (e.g. tables in a restaurant, Internet or telephone).

For the foregoing reasons, there is a need for an action verification system that can prevent the unauthorized actions and verify an Entity's identity. It is to such a system that the present invention is directed.

BRIEF SUMMARY OP THE INVENTION

Actions such as those, which occur when a Action Initiating Party (e.g. vendor or banks) wants to verify an action over the Internet, or verify validity of credit card signature, or verify a check signature by using verification method whereby the action's originator (the Entity) stored PINs/KEYs are used to verify the action. Whereby verification includes validation of Entity's identity and authorization.

In one such action, the Entity commonly orders an item and provides the Action Initiating Party with the Entity's credit card number, the amount to authorize and a PIN/KEY. The credit card number and PIN/KEY are used by the Action Initiating Party to verify the Entity's authenticity, and to verify that the Entity can in fact use the credit card to execute the particular action. If an unauthorized Entity obtains the Entity's credit card number, the unauthorized Entity can not use the credit card number in placing unauthorized action requests without obtaining the PIN/KEY numbers available only to the Entity. The action verification of the present invention is designed to substantially prevent unauthorized actions via any suitable communication link, such as the Internet.

In another embodiment of such an action, the Entity commonly writes several checks and provides different Action Initiating Parties with the Entity's PIN/KEY for each check. The PINs/KEYs can be generated by check writing software, which uses the same algorithm specific for the Entity. The account number, PIN/KEY and other optional personal data are used by the Action Initiating Party (vendor or bank) to verify the Entity's action, and to verify that the Entity can in fact use the account and check. If an unauthorized Entity obtains the Entity's checkbook, the unauthorized Entity can not use the checks in placing unauthorized checks without obtaining the PIN/KEY numbers. The action verification system of the present invention is designed to substantially prevent check fraud.

In another embodiment of such an action, an Entity commonly writes several checks and provides different Action Initiating Parties (vendors) with the Entity's PIN for each check. The PINs/KEYs can be entered later into a Verification Authority and can be used to verify and authorize the current actions. The Entity can also be notified by electronic means about the pending actions, which he can then authorize and assign PINs electronically. The account number and PINs/KEYs are used by the Action Initiating Party (vendor or bank) to verify the Entity's action, and to verity that the Entity can in fact use the account and check. If an unauthorized Entity obtains the Entity's checkbook, the unauthorized Entity can not use the checks in placing unauthorized checks without obtaining the PIN/KEY numbers which only the Entity can enter into the Verification Authority system. The action verification system of the present invention is designed to substantially prevent check fraud.

In another embodiment of such an action, an Entity commonly writes several checks or credit card slips and provides different action initiating parties (vendors) with the Entity's PIN/KEY for each check. The PINs/KEYs can then electronically transmitted into the Verification Authority System and used to verify the current actions. As another option for this embodiment, the Verification Authority can also generate PINs/KEYs electronically at the request of the Entity and transmit the PINs/KEYs electronically to the Entity, If an unauthorized person obtains the Entity's PINs/KEYs the unauthorized person can not use the PINs/KEYs in placing unauthorized actions because each PIN/KEY is specific for a specific action.

In another embodiment of such an action, an Entity authorizes access and transfer of his personal medical records electronically. He gives his doctor several PINs/KEYs to use for each transfer of the records. The file number and PINs/KEYs are used by the Action Initiating Party (doctor) to verify the Entity's authorization, and to verify that the Doctor can in fact transfer the personal records. In addition to the above verifications, other optional personal data submitted by the Entity can be verified against the data stored in the Verification Authority System.

In one another embodiment of this invention, an Entity can send a message that needs verification to a message receiving party. The PIN/KEY used in the message is verified against the pins stored in the Verification Authority central computer. If there is a matching PIN/KEY the message is authenticated and the sender Entity is verified.

In one another embodiment of this invention, an Entity identity can be verified at a request Action Initiating Party. The PIN/KEY submitted to an Action Initiating Party by an Entity in addition to optional several personal data parameters, are used for verification against the pins and personal data elements stored in the Verification Authority central computer. If the data matches, the identity is verified.

For the foregoing reasons, there is a need for a central verification system that can provide verification for actions using a central verification system. It is to such a verification system that the present invention is directed.

DETAILED DESCRIPTION

Definitions of Terms

Action Initiating Party (12)—The term "Action Initiating Party" as used herein means an individual, company, vendor or other Entity trying to verify an action.

Message receiving party (13a)—The term "Message receiving party" as used herein means an individual, company, vendor or other Entity trying to verify a message received requiring reliable verification and authorization.

Verification—The term "Verification" as used herein means validation of Entity's identity and authorization of an action.

Entity (14)—The term "Entity" as used herein means an individual, company, vendor or other organization which authorizes by giving a PIN/KEY, the execution, processing or delivering of an action.

Action—The term "action" as used herein means an action authorized by an Entity which can be requested and/or transmitted and/or delivered and/or executed electronically or mechanically. Wherein action includes a financial transaction, message, command, nonfinancial transaction, approval, identification request and data approval. Examples of such actions include ordering an item over the Internet, transferring money from an Entity's account to another account or verifying a check of an Entity's account.

Verification Authority (16)—The term "Verification Authority" as used herein means an individual, company, organization or other Entity which can embed and communicate with systems which embed the information and/or processes requiring verification together with the procedural capability to perform such verification. It should be noted that in this document the verification can be performed by the Verification Authority by using stored PINs/KEYs stored in the Verification Authority's central computer and by using other optional personal data parameters submitted by an Entity and verified against data stored in the Verification Authority central computer.

Computer System AND Computer AND Programmed Logic Systems—

The term "Computer System" and "Computer" and "Programmed Logic Systems" as used herein means a system or systems which are able to embody and/or execute the logic of the processes described herein. The logic embodied in the form of software instructions or firmware may be executed on any appropriate hardware which may be a dedicated system or systems, or a general purpose computer system, or distributed processing system, all of which are well understood in the art, and a detailed description of how to make or use such computers is not deemed necessary herein. It should be noted that the Verification Authority computer, and Action Initiating Party computer as described herein may be embedded within a single computer or programmed logic system, or be implemented as separate computers or programmed logic systems, or be executed on multiple systems using any of the distributed processing models as are well understood in the art, or be implemented using any mixture of the above.

Communication Link (32)—The term "communication link" refer to any suitable communication link which permit communications (e.g. Internet, computer network, telephone). It should be understood that the term "communication link" is not limited to "Internet" or any other particular system or type of communication link. That is, the term "communication link" is intended only to refer to any suitable communication system, including extra-computer system and intra-computer system communications. Examples of such communications systems include internal busses, local area networks, wide area networks, point-to-point shared and dedicated communications, infra-red links, microwave links, telephone links, CATV links, Satellite and radio links and fiber-optic links. The term "communication link" can also refer to any suitable communication system for sending messages between remote locations, directly or via a third party communication provider such as AT&T. In this instance, messages can be communicated via telephone or facsimile or computer synthesized voice telephone messages with or without voice or tone recognition, or any other suitable communications technique.

It should be understood that each of the communication links are shown and described separately herein for the sole purpose of clearly illustrating the information being communicated between the Verification Authority, the Entity and the Action Initiating Party. In operation, the communication links may not be separate communication links but may be a single communication link.

"PIN"— The term "PIN" or "Pin" or KEY or PIN/KEY refer to Personal Identification Numbers, Key Codes, public/private keys or Tokens. Each Entity will have sets of individualized PINs/Keys which one of them may be uniquely associated with, or identify a particular action, activity or other item that needs verification. The PINs/Keys may be stored with it referenced account number suitable for identifying a particular action. These PINs/Keys may be generated using a predetermined strategy or arbitrary generated by a computer. The PINs/KEYs may include a predetermined strategy formula to generate further sets of PINs/KEYs that can be used to verify future actions. Multiple predetermined strategy formulas can be selected from a library stored in the verification authority. The Entity can only perform the selection of the appropriate formula. PINs/KEYs can also be supplied to the Entity by a form of printed list or labels, or by using electronic means wherein the Entity may able to select a PIN/KEY and supply the PIN/KEY to the Action Initiating Party. The Entity can also supply PINs/KEYs to the Action Initiating Party at the time of initiating the action and then submit them for storage in the verification authority.

The Verification/Response transmission process can be done by means of a transformation, mapping or encryption process.

Figure 1:
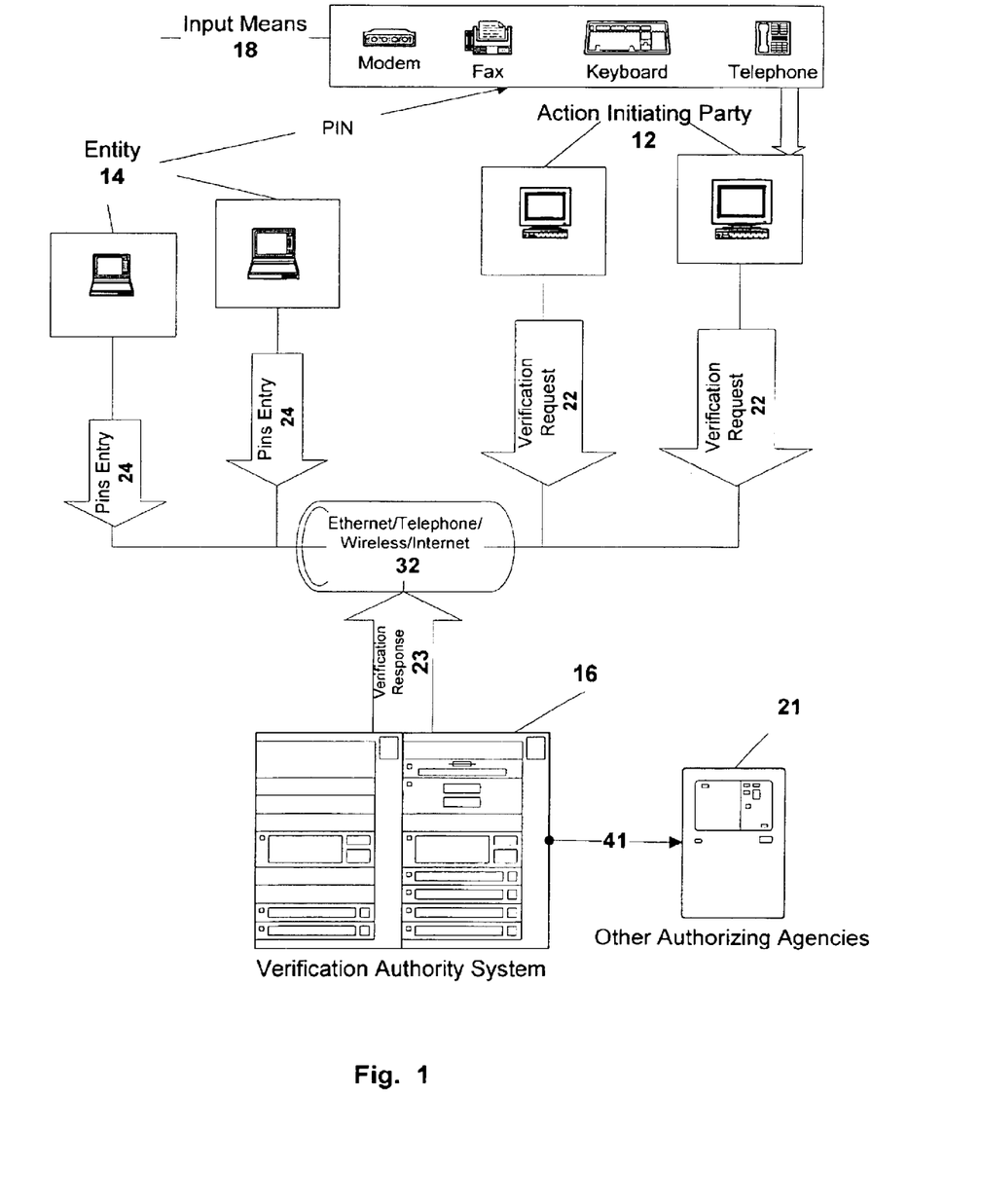
FIG. 1 is a schematic, diagrammatic view of an action verification system operating in accordance with the present invention, showing multiple entities and multiple action initiating parties.
Figure 2:
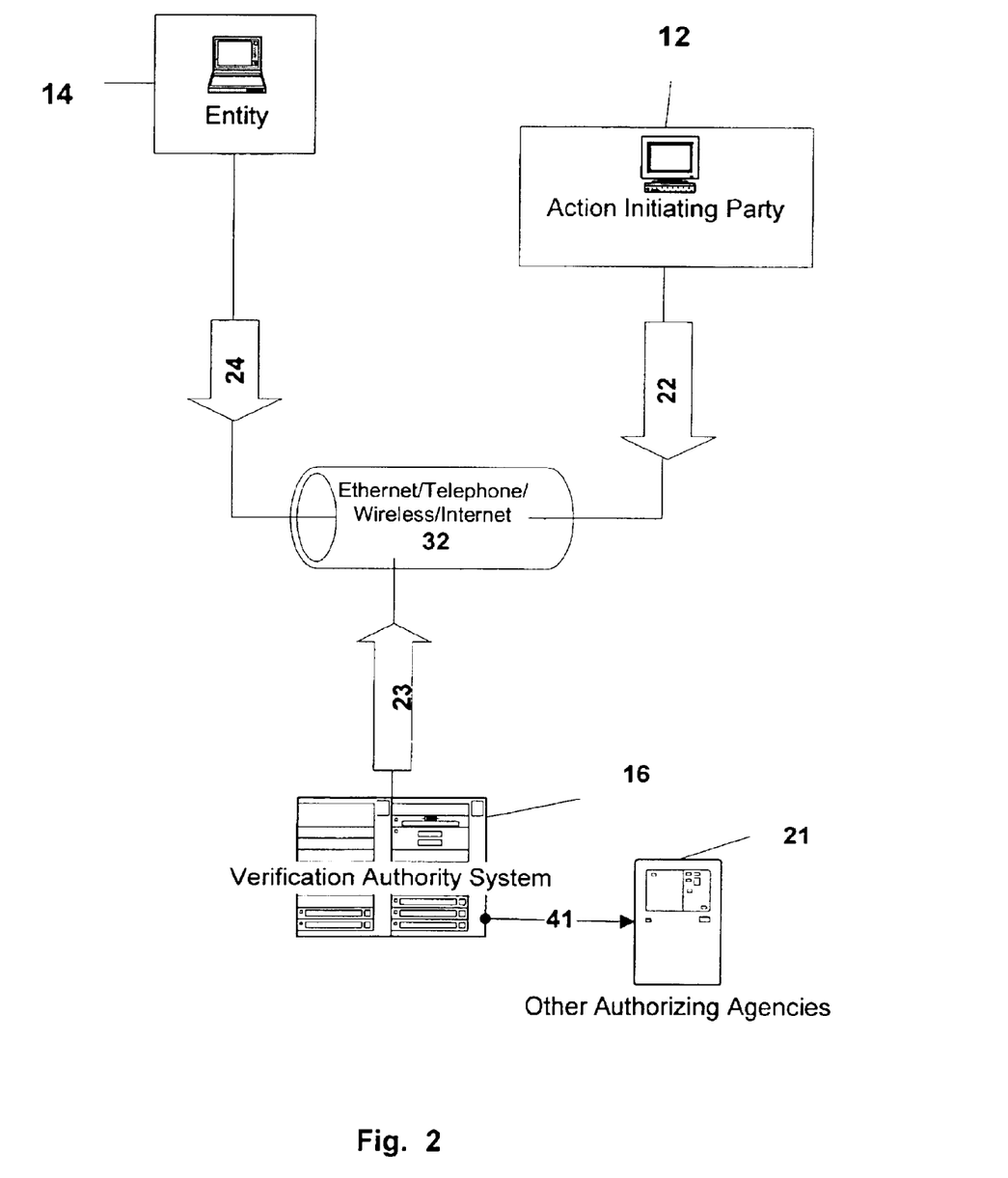
FIG. 2 is a schematic, diagrammatic view of an action verification system operating in accordance with the present invention, showing a single Entity and a single Action Initiating Party.

Description of Process—Preferred Embodiment (Referring to FIG. 1 and FIG. 2)

Shown in FIG. 1 is an Action Verification System for executing verifications of actions between a plurality of Action Initiating Parties 12 and a single Verification Authority 16. Each of the Action Initiating Parties 12 has an optional computer. Each one of the Entities 14 has an optional computer, which is usually located at the Entity's home or business. FIG. 2 is a simplified version of FIG. 1 and only one Entity 14 and one Action Initiating Party 12 are shown in FIG. 2 for purposes of clarity. The Action Initiating Party 12 computer, the Entity 14 computer, and the Verification Authority 16 computer can each be any suitable computer or computer system as discussed herein before.

In the following description, it should be noted that communication between the Entities, Verification Authorities and Action Initiating parties involved in a particular verification or action may be triggered automatically, for example, by means of a sequential logic process, or through a time schedule system, or alternatively may require a manual intervention to trigger the next phase of an action.

The Verification Authority and its computer is reflected as a separate functional block, it should be understood that the computer may be implemented in such a fashion that part or all of its logic can be embedded within either the Action Initiating Party 12 computer or the Entity's 14 computer.

Action Verification Request

When the Action Initiating Party 12 desires to execute a predetermined or particular action, originated by a predetermined or identified Entity 14, they would input an action verification request. The action verification request 22 can be inputted using any suitable input devices 18 which can be any input device capable of inputting information such as a keyboard, a scanner, a mouse, a modem, a telephone, a network adapter, a voice input device, a remote computer or the like. The action verification request 22 then will be transmitted to the Verification Authority 16 via communication link 32. In response to receiving the action verification request 22, the Verification Authority 16 computer stores the contents of the request for processing and record-keeping and later additional verification by the Entity 14.

Figure 6:
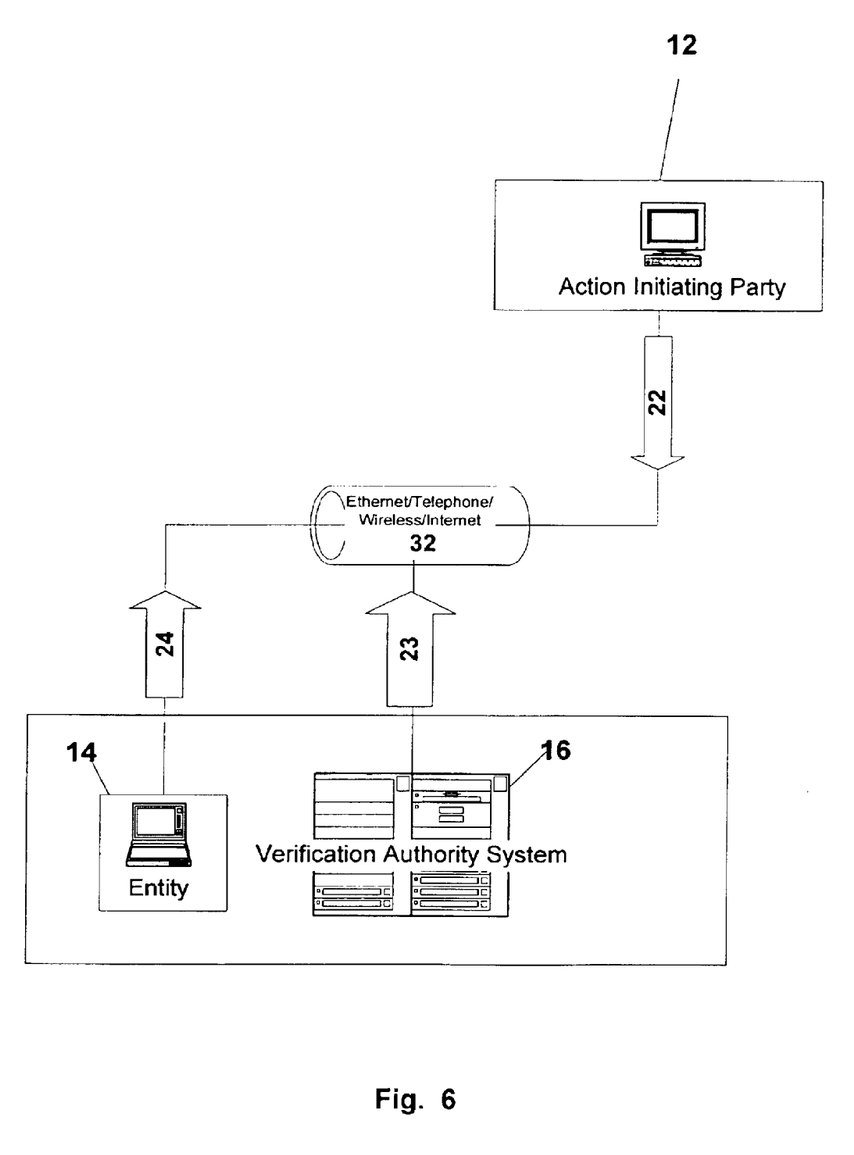
FIG. 6 is a schematic, diagrammatic view of another embodiment of an action verification system wherein the Verification Authority and the Entity are joined functionally.

The action verification request 22 transmitted between the Action Initiating Party 12 and the Verification Authority 16 typically contains the following information:

1. Action type
2. Action Initiating Party action reference
3. Entity's process-able account, action Value and action PIN/KEY
4. Optional Entity's name, social security number or other personal identification data
5. Optional Action Initiating Party identification code/key
6. Optional data attachments e.g. item/service description
7. Optional action quantity It should be noted that in some embodiments of the present invention (Referring to FIG. 6), the action verification request may not be transmitted to the Verification Authority 16, but instead may be transmitted to the Entity 14 via a communication link 32. In this embodiment the Entity serves also as the Verification Authority.

The Verification Authority 16 stores the request and then processes the request. It compares the PIN/KEY, account number and other personal data submitted in the verification request with the data stored in the Verification Authority. Only when there is a match between the stored data and the parameters sent in the verification request, the request is considered verified. Then the Verification Authority 16 formulates a verification request response 23. This response is transmitted by the Verification Authority 16 to the Action Initiating Party 12 via communication link 32. The verification response 23 typically contains the following information:

1. Action type
2. Entity's authorization code and reference
3. Verification response
4. Verification Authority action reference In response to the receipt of the request, the Verification Authority 16 may perform a number of internal and external validity checks before sending a Verification Response 23.

For example, that the action is valid and funds for the action are available. The Verification Authority may request further authorizations from other authorizing organizations 21 by submitting a request using communication link 41. For example, in case of bank checks or credit cards, authorization from the issuing banks for a transaction referenced in a Verification Request. After determining the validity of the transaction, the Verification Authority can send a response that may take the form of the Verification Response 23.

It should be noted that the data stored in the Verification Authority could only be accessed, reviewed and acknowledged by the Entity 14. The Entities will have sets of individualized PINs (key codes or tokens) which one of them may be uniquely associated with, or identify a particular action. The PINs/KEYs may take the form of password sets, numeric combination, numeric sequence or formula. The PINs/KEYs are entered or selected by Entities using communication link 32 and by using a PIN/KEY entry means 24. The PINs/KEYs may be stored with its referenced account number suitable for identifying a particular action. These PINs/KEYs could also be generated using a predetermined strategy or arbitrary generated by a computer. The PINs/KEYs may include also a predetermined strategy formula to generate further sets of PINs/KEYS that can be used to verify future transactions. Multiple predetermined strategy formulas can be selected from a library stored in the Verification Authority The Entity can only perform the selection of the appropriate formula stored within the Verification Authority by using the PIN/KEY entry means 24. PINs/KEYs can be delivered to the Entity by mechanical means, for example using printed lists or labels. The Entity then be able to select a key from his delivered PIN/KEY list and supply the PIN/KEY to the Action Initiating Party.

The PINs/KEYs are entered into and stored within the Verification Authority 16 using PIN/KEY entry means 24, which can be any suitable manner known in the art, digital signature technology, unique customer coded hardware or software, the use of public/private key encryption techniques or any other suitable form to assure that the keys are selected by the Entity only. The PINs/KEYs can also be generated automatically by the Verification Authority and then viewed and approved by the Entity. The Verification Authority 16 will typically store the PINs/KEYs for a predetermined period of time controlled either by the Entity or the Verification Authority. In addition to PINs/KEYs, other personal data can be stored and used for verification. For example name, social security number, address, date of birth or other personal data elements can be used together with PINs/KEYs to verify the transaction.

Faulty Verification Request

The Verification Authority computer 16 may issue a Faulty Verification Response to the Action Initiating Party 12 via communication links 32, and then retrieve information pertaining to incomplete or faulty verification actions, in order to build a model of faulty verification patterns. Alternatively, the Entity 14 and/or the Action Initiating Party 12 may receive information pertaining to incomplete or faulty actions.

Benefits

Each Action Initiating Party has no prior knowledge of the Entity's PIN/KEY for a specific action. That is, the Action Initiating Party 12 only accesses Verification Authority using a specific PIN/KEY submitted by the Entity for a specific Action. The centralized Verification Authority 16 is the only functional block with the capacity to verify the PINs/KEYs. In addition, in the preferred embodiment, the Entity's PIN/KEY will be different for each Action initiated with any Action Initiating Party.

While an unauthorized Entity may obtain other Entity's PINs/KEYs, and could even conceivably possess access to appropriate Action Verification PINs/KEYs (through monitoring communications, this would still not permit the entry of fraudulent Actions, as the Actions may require a new PIN/KEY for each Action. It may be added that PIN/KEY may be configured and grouped by the level and the amount of the Action and changed for any future Actions.

It may be noted that the Verification Authority 16 can store each of the transmissions between the Transaction Initiating Party 12, the Entity 14 and other authorizing organizations 21 to provide the system with a complete Action Verification history, analysis and auditing facilities. The system will scale well using a variety of computer technologies, and is capable of providing complete security against intrusion from unauthorized on-line attack, through the use of conventional electronic fire-wall technologies as are well understood in the art.

Examples of Other Embodiments

Other Verifications and Validation (Referring to FIG. 2)

At any time between the Action Verification Request 22 and the Verification Response 23, the Verification Authority 16 may perform other tests on the validity of the action. These tests include, but are not limited to:

ensuring that the action PIN/KEY is valid.

ensuring that the accounts referred to are valid and usable for the action.

ensuring that the conditions attached to the accounts used are honored, e.g. funds are available.

The Verification Authority 16 may decline to process Action Verification or may refuse to verify Actions based on the results of such tests. In the preferred embodiment, any other validation such as suggested above will occur at this time, as complete information about the action including the validity of the action will be known to the Action Initiating Party 12. At this time other authorizing agencies 21 may be contacted via link 41 to provide the system with complete action verification. Other activities triggered by a valid action could also be performed at this time, for example a transfer of funds from an Action Initiating Party to an Entity's account.

Figure 3:
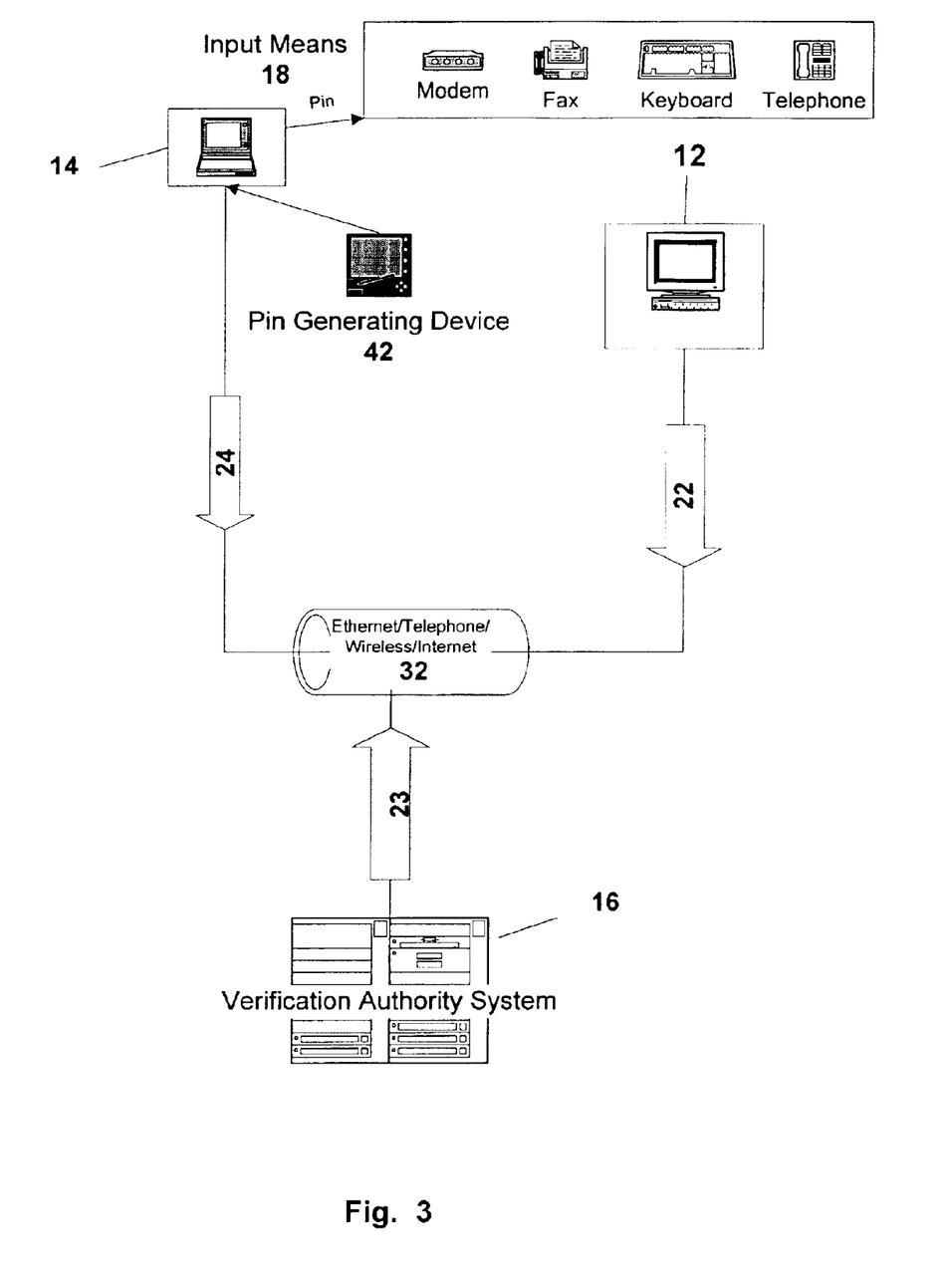
FIG. 3 is a schematic, diagrammatic view of another embodiment of an action verification system operating with a PIN/KEY-generating device.
Figure 4:
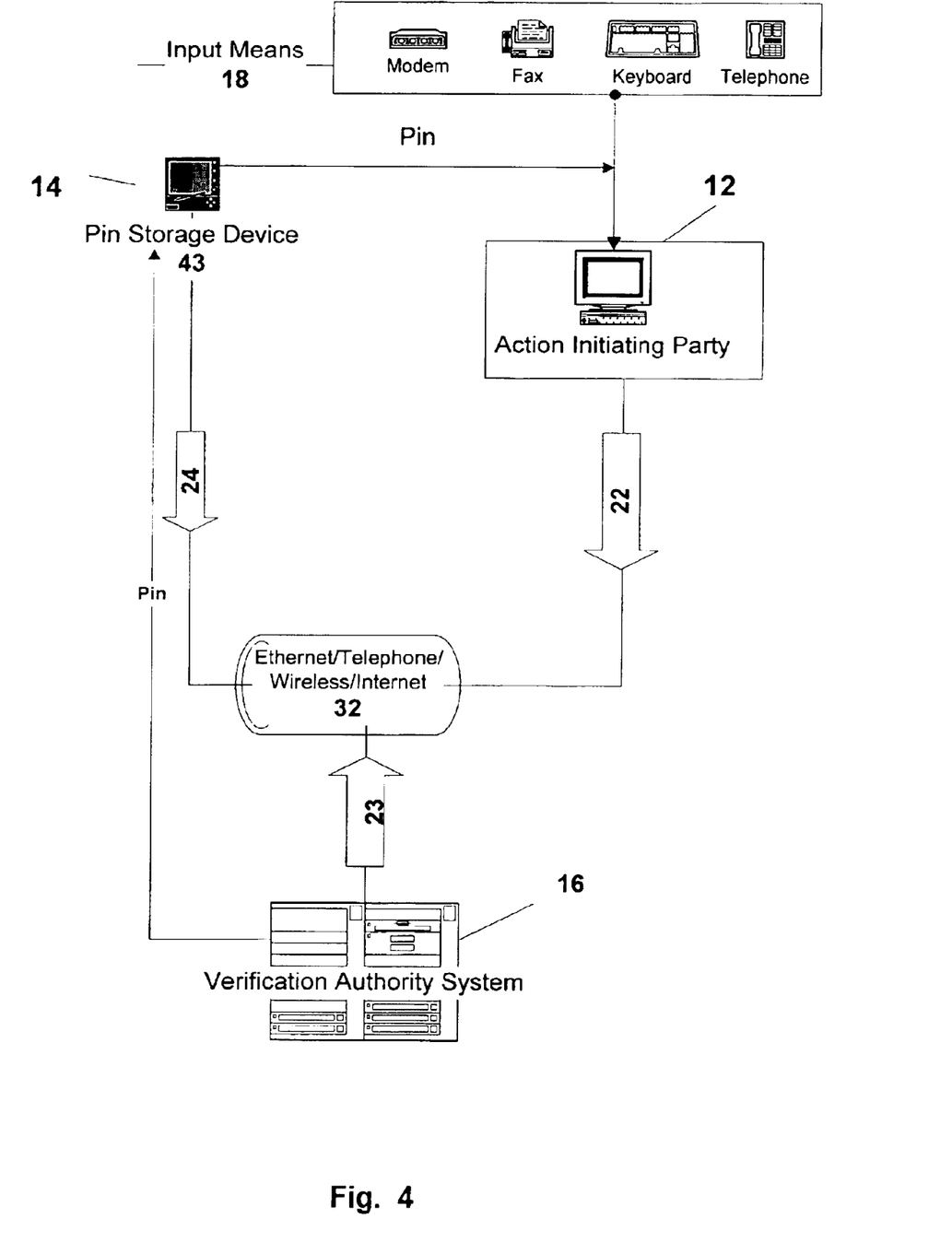
FIG. 4 is a schematic, diagrammatic view of another embodiment of an action verification system operating with a PIN/KEY storage device.

In one other embodiment (Referring to FIG. 3), the Action Initiating Party 12 may be programmed such that, when they input the Action Initiation Request to be transmitted to the Verification Authority 16, the Entity can type the Action PIN/KEY into the input device 18. In this example, because the PIN/KEY is not revealed to the Action Initiating Party, the PIN/KEY may be used several times for similar Actions until the Entity decides to change the PINs/KEYs. The Entity may also use a PIN/KEY-generating device 42 to generate PINs/KEYs based on a formula known and stored in the Verification Authority. In this example the Entity can only perform the selection of the appropriate formula stored within the Verification Authority's that should be the same formula selected in the PIN/KEY generating device 42.

in one other embodiment (Referring to FIG. 4), the Action Initiating Party 12 may be programmed such that, when an Action Initiation Request is input by the Action Initiating Party to be transmitted to the Verification Authority 16, the Entity can supply the action PIN/KEY using a PIN/KEY storage device 43. The PIN/KEY storage device 43 stores action PINs/KEYs for current and future actions. The PINs/KEYs stored in the storage device 43 are received by communications means from the Verification Authority 16. The Entity may access and get log-in entry into the content of the PINs/KEYs stored in the PIN/KEY storage device 43 using his personalized password, eye-retina scanning or finger print scanning. After obtaining a PIN/KEY from the PIN/KEY storage device 43 the Entity can input the PIN/KEY into the Action Initiating Party input device 18.

Figure 5:
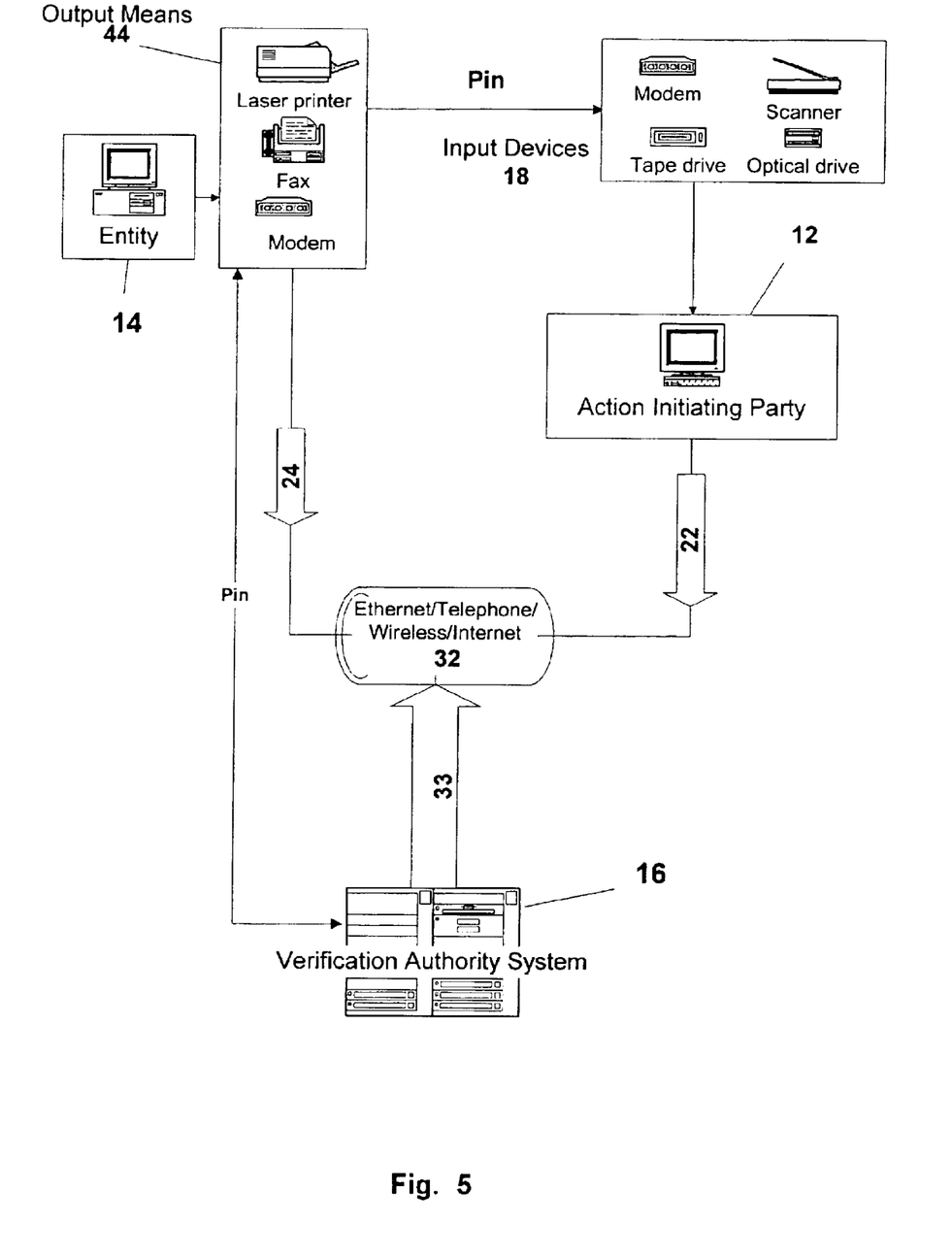
FIG. 5 is a schematic, diagrammatic view of another embodiment of an action verification system operating with Entity's various output means.

In one other embodiment (Referring to FIG. 5), the Action Initiating Party 12 can be programmed such that, when an Action Initiation Request is input by the Action Initiating Party to be transmitted to the Verification Authority 16, the Entity PIN/KEY can be read automatically by an input device 18 (e.g. check reader or scanner). In this embodiment the Entity may request from the Verification Authority 16 the print out of stored PINs/KEYs for each account. The Entity then prints the PINs/KEYs using output means 44. Output means 44 may include printers, fax, modem or other computer output devices. In one option of this embodiment the PINs/KEYs may be written, or typed over action slips (e.g. Credit card slips or checks) using the printed PIN/KEY list. The Entity may also print using the output means 44, a pre-printed set of labels, which have the PINs/KEYs, printed over them. Then the Entity can use each label for each specific action by posting the label on the action slip (e.g. labels posted on credit card slips or checks). In a different option of this embodiment the printed PINs/KEYs may be printed electronically to output means 44 and than transmitted electronically to the Action Initiating Party input devices 18.

In one other embodiment (Referring to FIG. 2), the Entity's computer 14 may be programmed such that the Entity can directly request to initiate an action from the Action Initiating Party 12 using communication link 32. The Entity enters details of the action and then inputs an action PIN/KEY into the Action Initiating Party input devices 18. All the verification processes are processed on-line using communication link 32. In this embodiment the Action Initiation Request 22 will be sent to the Verification Authority 16, after the Entity 14 had initiated the action. The Entity 14 may also access the Verification Authority 16 simultaneously and update his PIN/KEY list on-line.

In one other embodiment (Referring to FIG. 6), the Entity 14 may reside with the Verification Authority 16 and programmed such that, Entities will be able to pick their PINs/KEYs as described before, and then input the PINs/KEYs by means described before. In this embodiment, the Entity 14 and the Verification Authority 16 may be the same organization and may share same computer hardware and software means. The method of verification can be done as described in the preferred embodiment.

Figure 7:
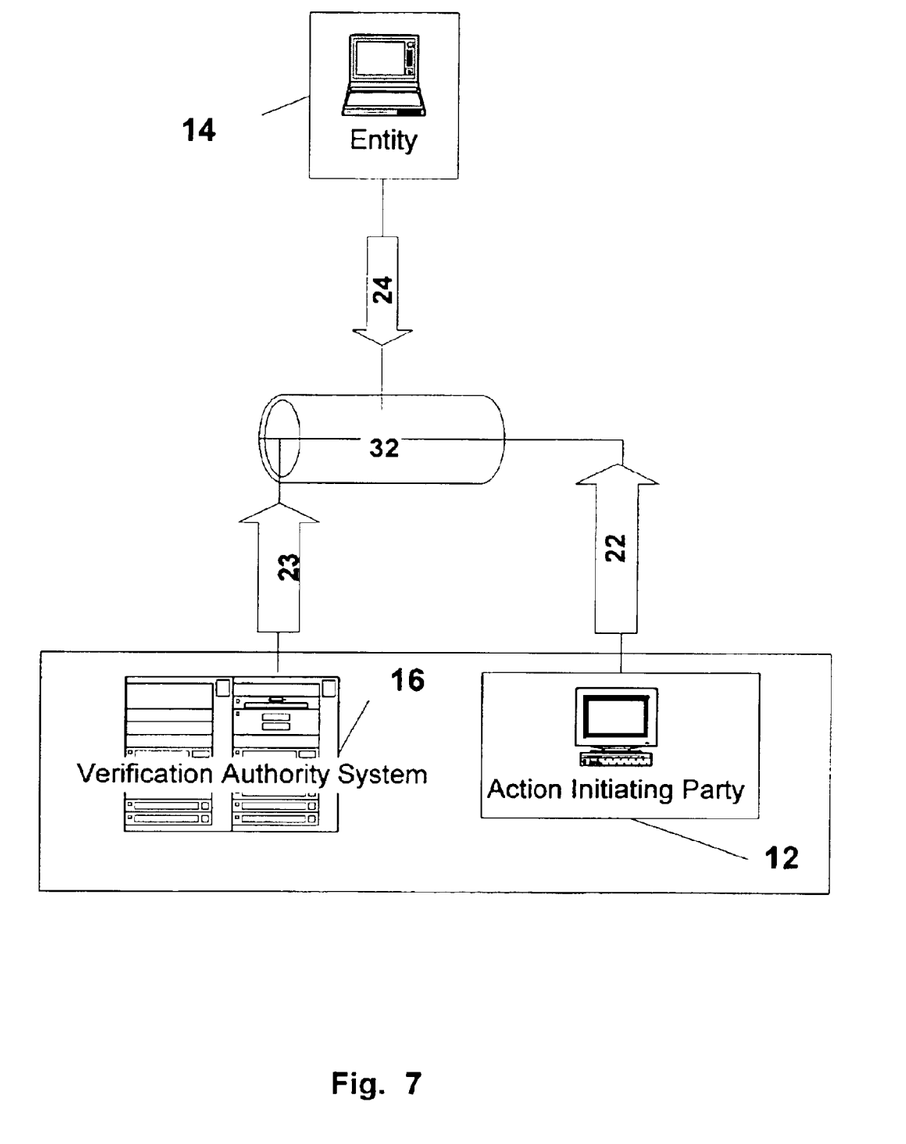
FIG. 7 is a schematic, diagrammatic view of another embodiment of an action verification system wherein the Verification Authority and the Action Initiating Party are joined functionally.

In one other embodiment (Referring to FIG. 7), the Action Initiating Party 12 may reside with the Verification Authority 16 and programmed such that, Entities will be able to pick their PINs/KEYs as described before, and then input the PINs/KEYs by means described before. In this embodiment, the Action Initiating Party and the Verification Authority may be the same organization (e.g. a bank and its check verification department, or a credit card company). The method of verification can be done as described in the preferred embodiment where as an option method for PIN/KEY entry, the PINs/KEYs may be written or typed over action slips (e.g. Credit card slips or checks), or the Entity may glue a pre-printed label with a printed PIN/KEY particular for the specific action.

Figure 8:
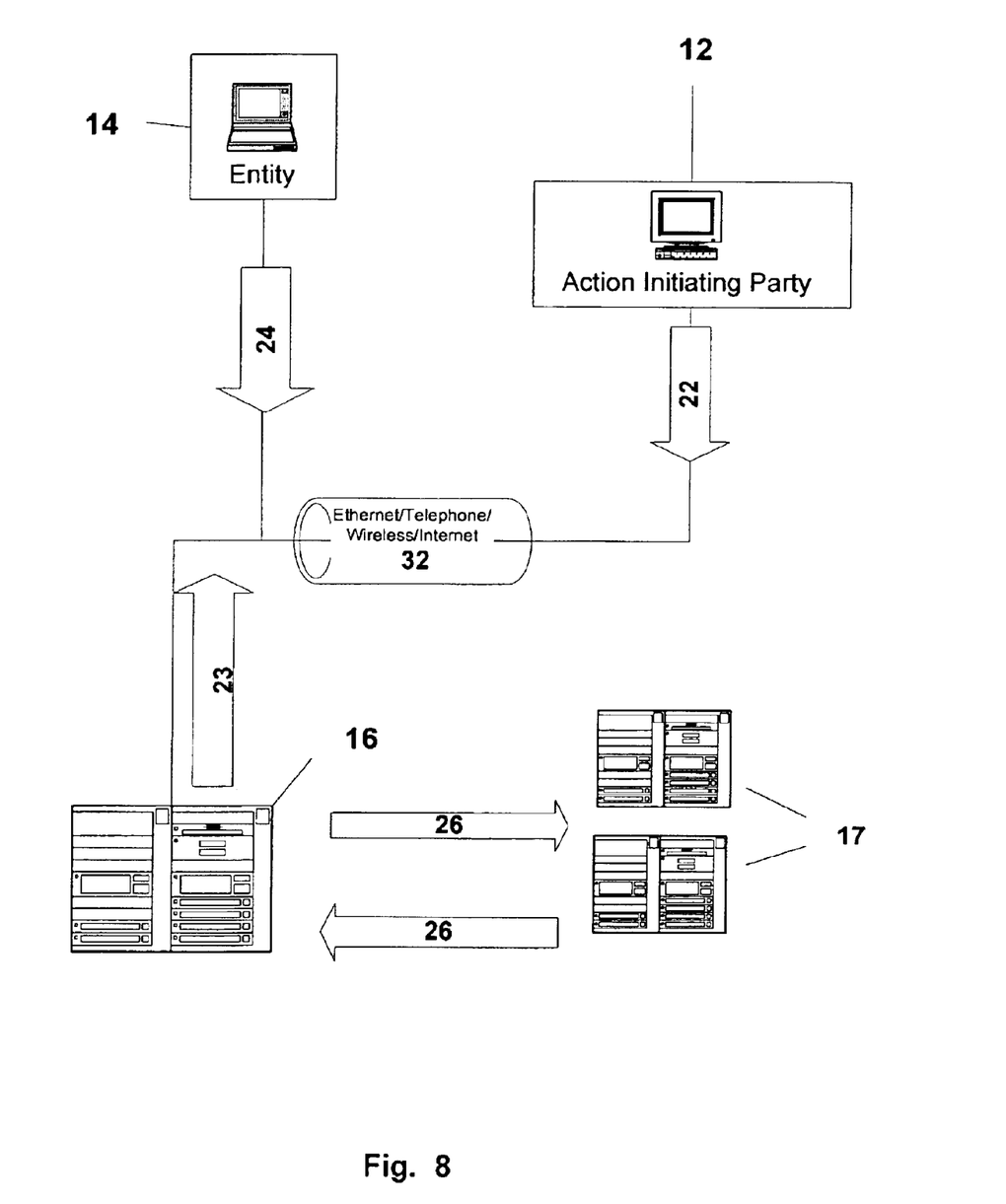
FIG. 8 is a schematic, diagrammatic view of another embodiment of an action verification system depicting plural verification authorities sharing verification data.

In one other embodiment (Referring to FIG. 8), the Verification Authority 16 may be programmed such that, other verification authorities 17 can share data and provide further verification. Entity 14 will be able to pick their PINs/KEYs as described before, and then input the PINs/KEYs by means described before into one Verification Authority 16, which may propagate the information to other Verification Authorities 17 using a verification propagating protocol 26. Action Verification Request 22 can also be propagated to other Verification Authorities 17 using a verification propagating protocol 26. Action Verification Response 23 can also be propagated to Verification Authority 16 from other Verification Authorities 17 using a verification propagating protocol 26. In this embodiment, the Verification Authority may be composed of several Verification Authority systems belonging and operating by different organizations (e.g. a bank A, bank B and a credit card company).

Figure 9:
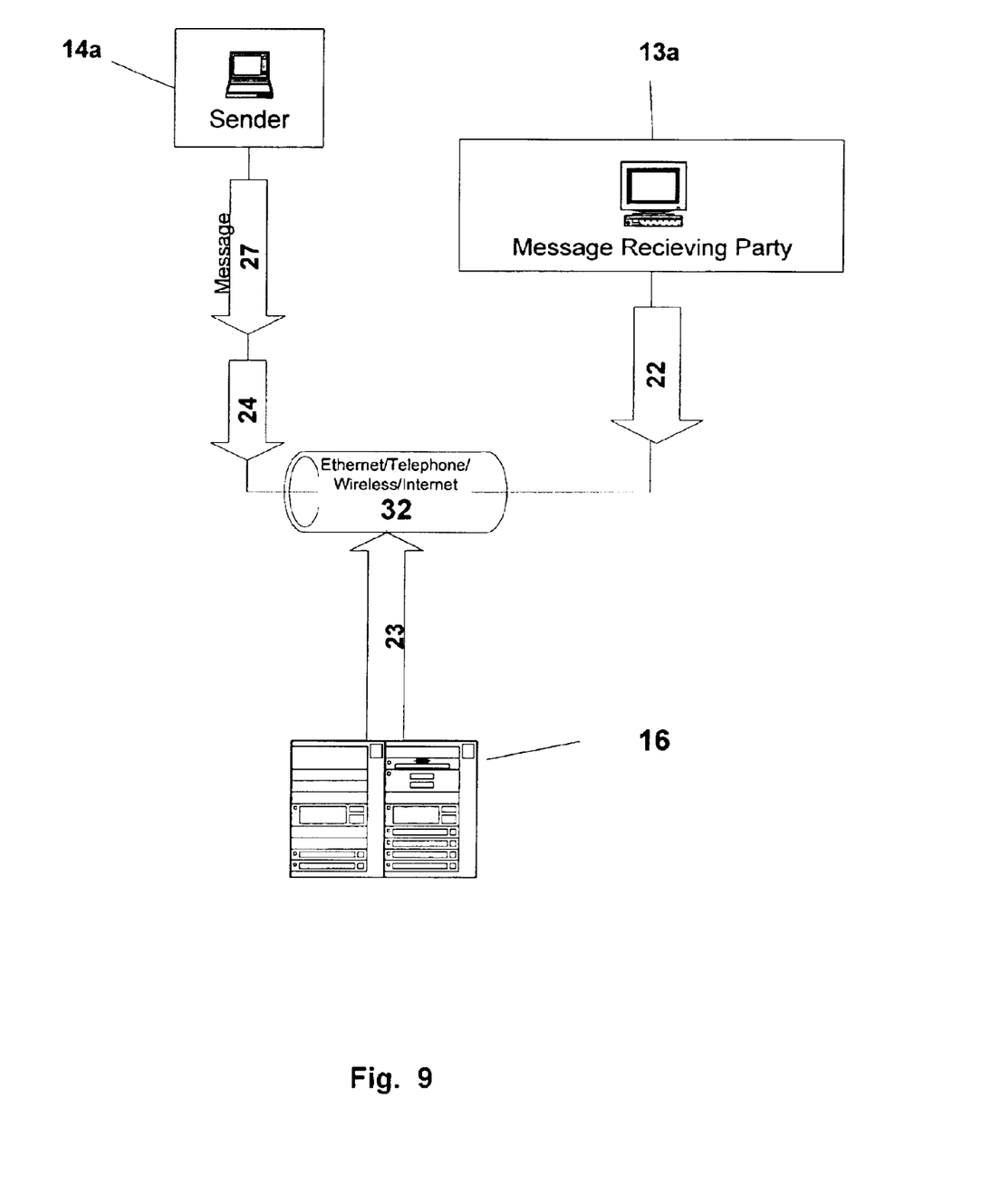
FIG. 9 is a schematic, diagrammatic view of another use of an action verification system where verified messages are sent from a sender to a message receiving party.

In one other embodiment (Referring to FIG. 9), the Entity 14a referred in this embodiment as the sender, sends a message 27 that includes a PIN/KEY and a referenced account number identified with the sender to a Message Receiving Party 13a. The message 17 as used herein means any data including a specific action, command, contract, or electronic data authorized by an Entity 14a, transmitted and/or delivered and/or executed electronically or mechanically. The Message Receiving Party 13a tries to verify the message received by sending a verification request 22 to the Verification Authority 16. The Verification Authority then verifies the PIN/KEY and other transmitted data with the data stored in its central computer using the same methods as described before. When the Verification Authority verifies the message it sends verification response 23 verifying the message in the same manner as described in the preferred embodiment.

Figure 10:
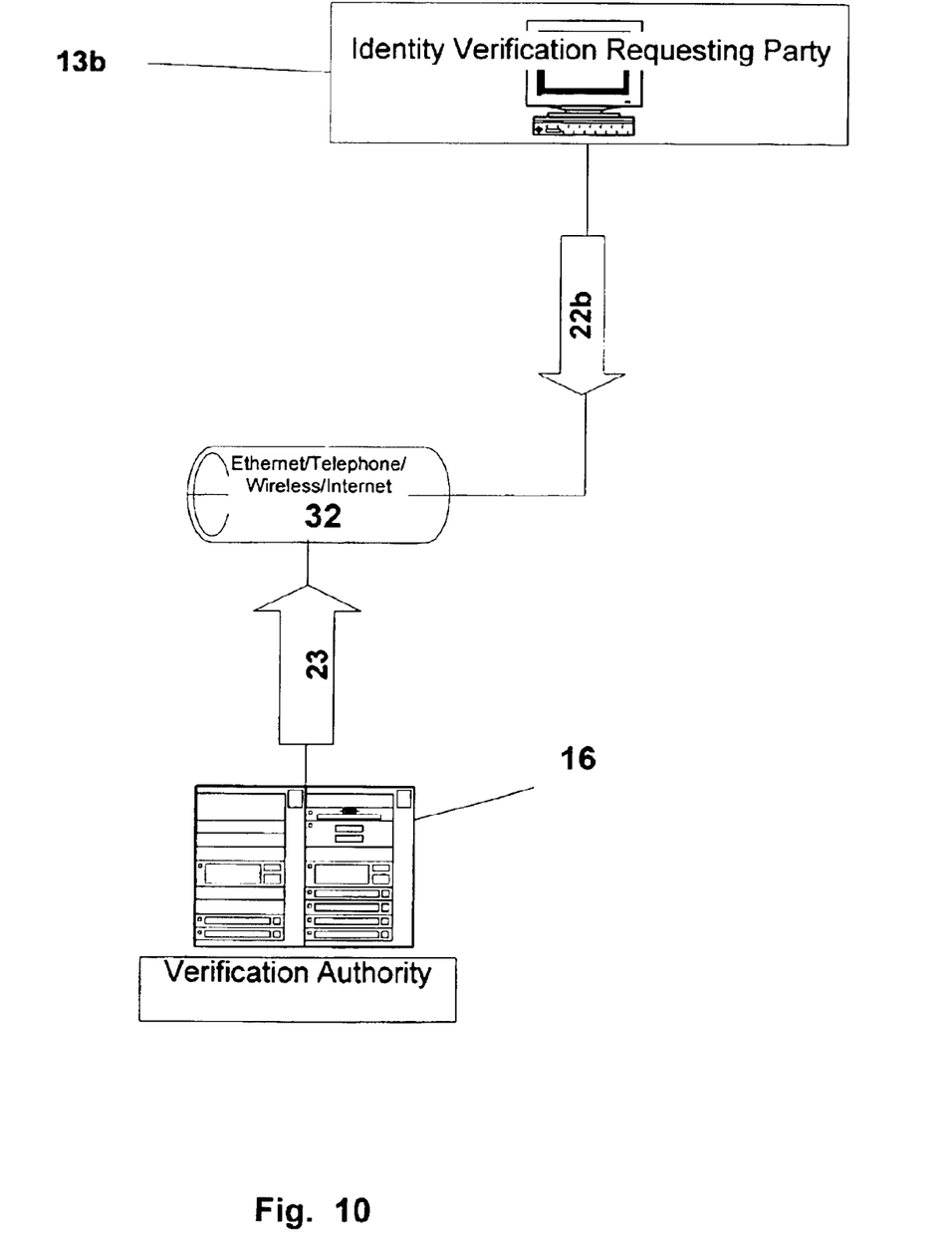
FIG. 10 is a schematic, diagrammatic view of another use of an action verification system where Entity identity is verified.

In one other embodiment (Referring to FIG. 10), the system as described in the preferred embodiment can be modified and used to identify Entity's Identity. An Identity Verification Requesting Party 13b replaces the functionality of the Action Initialing Requesting party, whereby all verification functionality remains similar to the manner described in the preferred embodiment. When an Identity Verification Requesting Party 13b desires to verify an Entity's identity, it submits a Verification Request 22b using communication means 32 to the Verification Authority 16. The Verification Request 22b includes a PIN/KEY and an account number assigned to this specific identity identifying the identity. The Verification Request 22b may include personal data parameters for further verification purposes. The Verification Authority 16 then uses for verification the key/pin, the account number and the optional personal parameters sent in the verification request 22b. The Verification Authority then performs the verification by accessing and retrieving stored referenced key/pins, account number and personal data parameters and comparing pin/key account number and personal data parameters contained in the verification request 22b. When the data matches the Verification Authority verifies positively the identity and sends a verification response 23 in the same manner as described in the preferred embodiment. This embodiment can be used for identify verification from any location. Furthermore requirement for signature authentication can be replaced by using the above embodiment. PINs/KEYs and identity account numbers can be used instead of signatures thus identifying the Entity without using signatures.

While only one cycle of each process or method disclosed herein has been described in detail, it should be understood that the processes or methods disclosed herein are designed to be repeated for any one of a number of predetermined times so that Action Verifications can be executed between any one of the Action Initiating Parties and any one of the Verification Authorities.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method, via an Ethernet/Telephone/wireless/Internet network, for action verification using central verification authority comprising:

storing for a timed period in a verification authority computer system data base a plurality of personal identification numbers selected and generated by entities, and a referenced account, said plurality personal identification numbers including, (a) secret key sets, (b) public/private key sets, (c) one time key sets, said entities includes an individual, company or organization which authorizes, via a computer network, by giving a personal identification number, the execution, processing or delivering of an action, and said action includes a financial transaction, message, command, non-financial transaction, approval, identification request arid data transmittal;

said timed period including, (a) time limit for expiration of personal identification numbers, (b) time for initial effect of the personal identification numbers, submitting a verification request, via the computer network, requesting a verification of said action to said verification authority from an action initiating party, said verification request including a said personal identification number identifying said action and a text stream identifying a referenced account;

receiving by said verification authority, via the computer network, said verification request;

verifying said verification request by said verification authority computer system wherein said verification authority uses said communicated account and said personal identification number to access and retrieve said stored referenced personal identification numbers by using comparing means for comparing said verification request personal identification number to a collection of said personal identification numbers belonging to the referenced communicated account contained in said verification request, thereby verifying an action when personal identification number and referenced account match;

sending a verification response, via the computer network, indicating either a verified action or an invalid action from said verification authority to the said action initiating Party.

2. The method of claim 1, further including the step of receiving said verification response by said action initiating party and executing an action in response to said verification response indicating a verified action.

3. The method of claim 1, further including a key uniquely identifying said action initiating party, wherein key is included in said verification request.

4. The method of claim 1, further including means for storing said verification request and said verification response by said verification authority.

5. The method of claim 1, further including a key uniquely indicating the encryption parameters and reference algorithm used by said verification initiating party sent in said verification request and used by said verification authority to decrypt or encrypt said verification request.

6. The method of claim 1, further including personal identification parameters identifying said entity transmitted in said verification request and used by said verification authority to verify the request by using means for comparing the personal data parameters sent in said verification request to personal data parameters stored in said verification authority.

7. The method of claim 1, further comprising of communication link electronic or any other suitable communications technique, between said action initiating parties, said verification authority and said entities, using means of a transformation, mapping or encryption process-using selected algorithm.

8. The method of claim 1, further comprising of means for encrypting and decrypting the transmitted data sent by said action initiating party, said entity and said verification authority, using communication link electronic or any other suitable communications technique, further comprising of means for a transformation, mapping or encryption process-using algorithm selected and stored in the said verification authority central computer.

9. The method of claim 1, further comprising of means for data input into said verification authority for each of the said stored accounts including:

a set of referenced action PIN codes, a set of secret keys, a set of public/private keys, a set of personal data parameters, input selection of reference algorithm, input selection of pseudo-random number generating means which generates a pseudo-random number having a plurality of digits, input selection of pseudo-random generating means which generates a pseudo-random key having a plurality of alphanumeric characters.

10. The methods of claim 1, further comprising of plural verification authorities, wherein each said verification authority may exchange verification information with each of the other verification authorities and may include further verification and authorization capabilities.

11. The method of claim 1, further including portable data input means for input of said personal identification numbers and other personal information sent for verification to the said verification authority central computer.

12. The method of claim 1, further including a personal identification number generating means used to generate said personal identification numbers based on a set of formulas stored in said verification authority and selected by said entity.

13. The method of claim 1, further including a storage device for storing and selecting personal identification numbers, wherein personal identification numbers are stored in said storage device and are received by communications means from said verification authority.

14. The method of claim 1, further including the steps of:

printing by said entity using output printing means, said stored personal identifying numbers, wherein output printing means include printers, label printers and magnetic media storage;

posting each printed personal identification number on said action initiating party input method, wherein said action input method includes personal checks, credit card slips, orders and legal contracts;

writing each printed personal identification number on said action input method;

printing by said entity said personal identification number using computer hardware means.

15. The method of claim 1 wherein the Central Verification Authority database comprises account information of entities, the account information maintained in the database for each entity including;

(a) A plurality of secret keys for each entity generated and selected by the entity, (b) A plurality sets of public/private keys for each entity generated and selected by an entity, © Information for securely linking with the means requesting the keys; said entity includes an individual, company or organization.

* * * * *